US012454250B2

(12) United States Patent
Suzuki et al.

(10) Patent No.: US 12,454,250 B2
(45) Date of Patent: Oct. 28, 2025

(54) DRIVE MOTOR CONTROL SYSTEM AND SNOW REMOVAL SYSTEM FOR VEHICLE

(71) Applicant: SUBARU CORPORATION, Tokyo (JP)

(72) Inventors: Shotaro Suzuki, Tokyo (JP); Yoshitsugu Inoue, Tokyo (JP); Hiroyuki Akiyama, Tokyo (JP); Go Yanagisawa, Tokyo (JP); Takahiro Kawashiri, Tokyo (JP); Tong Wang, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 81 days.

(21) Appl. No.: 18/610,112

(22) Filed: Mar. 19, 2024

(65) Prior Publication Data
US 2024/0326757 A1 Oct. 3, 2024

(30) Foreign Application Priority Data

Mar. 28, 2023 (JP) ................... 2023-052418

(51) Int. Cl.
B60S 1/66 (2006.01)
B60L 50/14 (2019.01)
(Continued)

(52) U.S. Cl.
CPC .............. B60S 1/66 (2013.01); B60L 50/14 (2019.02); B60L 50/60 (2019.02); B60L 58/27 (2019.02);
(Continued)

(58) Field of Classification Search
None
See application file for complete search history.

(56) References Cited

U.S. PATENT DOCUMENTS 6,963,049 B1* 11/2005 Martin ............... B60S 1/54
219/202
6,968,265 B2* 11/2005 Wakitani ............ B60L 15/18
701/1
(Continued)

FOREIGN PATENT DOCUMENTS

JP S61-169358 A 7/1986
JP H4-118339 A 4/1992

OTHER PUBLICATIONS

Tips for Getting Your Car Out of the Snow, Gale Staff, Mar. 8, 2022 available online @ https://blog.gale.com/tips-for-getting-your-car-out-of-the-snow/ accessed Jul. 25, 2025 (Year: 2022).*

Primary Examiner — Daniel L Greene
(74) Attorney, Agent, or Firm — Rimon P.C.

(57) ABSTRACT

A drive motor control system performs control of a drive motor of a vehicle that includes the drive motor and a battery. The drive motor control system includes a control processor that controls an electric current supply from the battery to the drive motor and includes an operational state determiner that determines whether a condition that the vehicle is being stopped, a condition that a parking brake is being released, and a condition that a parking range is being selected are satisfied. When the operational state determiner determines that all the conditions are satisfied upon a reception of a trigger signal instructing a start of the control of the drive motor, the control processor performs control of an inverter such that the electric current supply is performed to cause the drive motor to repeat small reverse rotations and thereby induce small movements of the vehicle in front and rear directions.

7 Claims, 4 Drawing Sheets

(51) Int. Cl.
*B60L 50/60* (2019.01)
*B60L 58/27* (2019.01)

(52) U.S. Cl.
CPC ....... *B60L 2210/44* (2013.01); *B60L 2260/22* (2013.01)

(56) References Cited

U.S. PATENT DOCUMENTS

| | | | | |
|---|---|---|---|---|
| 7,921,502 | B1* | 4/2011 | Valverde | B60S 1/66 |
| | | | | 15/53.1 |
| 2005/0082096 | A1* | 4/2005 | Oono | F16H 63/483 |
| | | | | 903/910 |
| 2013/0042548 | A1* | 2/2013 | Clifford | E04D 13/106 |
| | | | | 15/94 |
| 2017/0238363 | A1* | 8/2017 | Oskwarek | B60S 1/66 |
| | | | | 219/491 |
| 2018/0309043 | A1* | 10/2018 | Kobrin | H10N 30/87 |
| 2019/0061703 | A1* | 2/2019 | Carroll | B05B 9/04 |
| 2020/0055362 | A1* | 2/2020 | Anderson | B60G 17/019 |
| 2021/0055728 | A1* | 2/2021 | Pomish | G05D 1/0088 |
| 2023/0116186 | A1* | 4/2023 | Kim | G01B 11/22 |
| | | | | 73/170.17 |
| 2023/0294713 | A1* | 9/2023 | Pesa | B60H 1/00785 |
| | | | | 701/36 |

* cited by examiner

DRIVE MOTOR CONTROL SYSTEM AND SNOW REMOVAL SYSTEM FOR VEHICLE

CROSS-REFERENCE TO RELATED APPLICATIONS

The present application claims priority from Japanese Patent Application No. 2023-052418 filed on Mar. 28, 2023, the entire contents of which are hereby incorporated by reference.

BACKGROUND

The disclosure relates to a drive motor control system that controls a drive motor that is mounted on a vehicle and causes the vehicle to travel, and a snow removal system that removes snow accumulated on the vehicle.

In cold areas or cold seasons, there is often a case where snow is accumulated on a vehicle, and the snow hinders a user of the vehicle from performing ordinary driving of the vehicle unless the snow is removed. Techniques to remove the snow accumulated on a vehicle are described in Japanese Unexamined Patent Application Publication (JP-A) Nos. S61-169358 and H4-118339, for example.

A snow removal apparatus disclosed in JP-A No. S61-169358 includes a mounting pallet on which a vehicle is to be mounted, and vibrators that support the mounting pallet in a movable manner and apply vibrations to the mounting pallet. The mounting pallet includes respective pallet sections for the wheels of the vehicle, and these pallet sections are provided with the respective vibrators. The pallet sections are thus configured to be vibrated individually from each other. Further, the mounting pallet is configured to be inclined with respect to a ground surface on which the mounting pallet is placed in order to enhance snow removal performance.

A snow removal apparatus disclosed in JP-A No. H4-118339 is configured to remove the snow accumulated on a bus roof. Water pipes are inserted in lightweight holes provided in rafters of the bus roof, and the water in a water tank heated by an exhaust system of an engine is supplied to the water pipes by means of a pump. The bus roof in contact with the snow is heated by the heat of the water pipes, and the snow in contact with the bus roof is thereby melted and brought into an easy-to-slide state. Thereafter, the snow is removed from the bus roof by vibrations of the bus generated upon the start of traveling, for example. This achieves automatic removal of the snow.

SUMMARY

An aspect of the disclosure provides a drive motor control system for a vehicle that includes a drive motor for travel of the vehicle and a battery coupled to the drive motor via an inverter and serving as a driving current supply source. The drive motor control system is configured to perform control of the drive motor of the vehicle and includes a control processor configured to control an electric current supply from the battery to the drive motor. The control processor includes an operational state determiner configured to determine whether a condition that the vehicle is being stopped, a condition that a parking brake is being released, and a condition that a parking range is being selected are satisfied. The control processor is configured to, when the operational state determiner determines that all of the condition that the vehicle is being stopped, the condition that the parking brake is being released, and the condition that the parking range is being selected are satisfied upon a reception of a trigger signal instructing a start of the control of the drive motor, perform control of the inverter such that the electric current supply from the battery to the drive motor is performed to cause the drive motor to repeat small reverse rotations and thereby induce small movements of the vehicle in a front direction and a rear direction.

An aspect of the disclosure provides a snow removal system for a vehicle that includes a drive motor for travel of the vehicle and a battery coupled to the drive motor via an inverter and serving as a driving current supply source. The snow removal system is configured to perform control of the drive motor of the vehicle and includes a control processor configured to control an electric current supply from the battery to the drive motor. The control processor includes an operational state determiner configured to determine whether a condition that the vehicle is being stopped, a condition that a parking brake is being released, and a condition that a parking range is being selected are satisfied. The control processor is configured to, when the operational state determiner determines that all of the condition that the vehicle is being stopped, the condition that the parking brake is being released, and the condition that the parking range is being selected are satisfied upon a reception of a trigger signal instructing a start of the control of the drive motor, perform control of the inverter such that the electric current supply from the battery to the drive motor is performed to cause the drive motor to repeat small reverse rotations and thereby induce small movements of the vehicle in a front direction and a rear direction.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
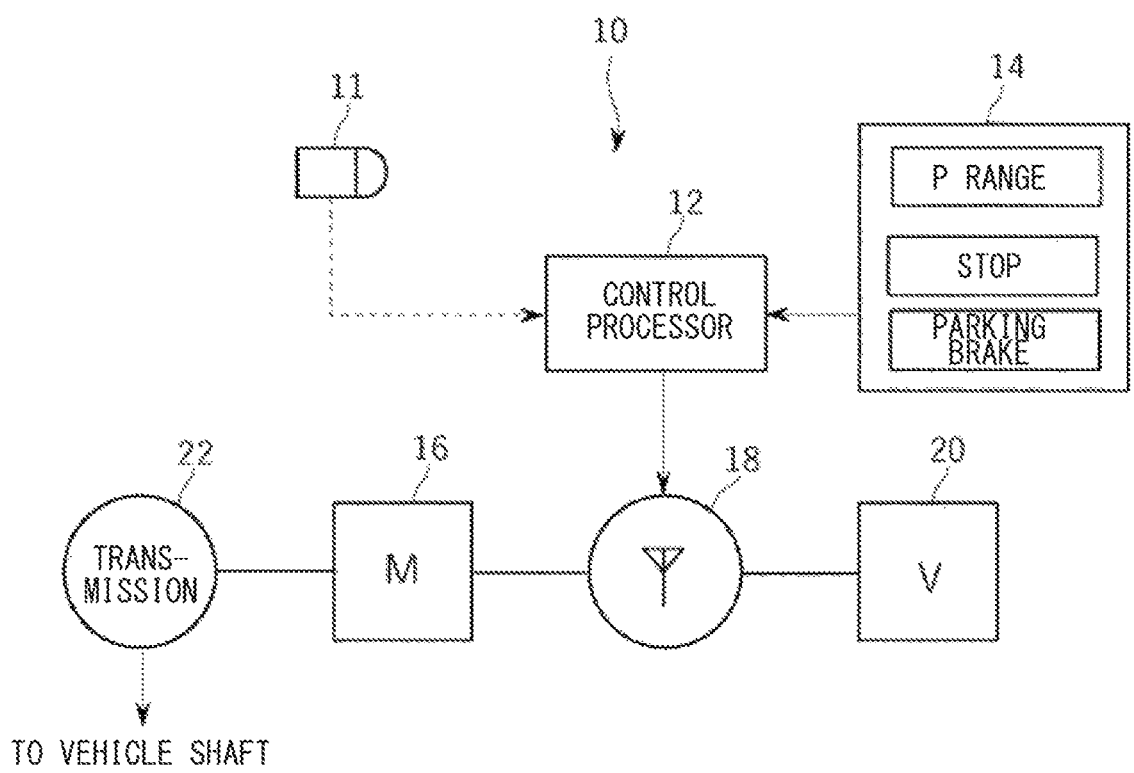
FIG. 1 is a block diagram illustrating an exemplary configuration of a drive motor control system for a vehicle according to one example embodiment of the disclosure.

JP-A No. S61-169358 discloses a technique for removing the snow accumulated on a vehicle by vibrating the vehicle. According to the technique, a mounting pallet, which is a structure on which the vehicle is to be mounted, is necessary to be placed on a ground surface on which the vehicle is going to be parked. However, there are various parking places where vehicles are parked for a certain time, and there are often cases where snow is accumulated on the vehicles parked in the various parking places in cold areas.

It is inconvenient that the vehicle is unavailable unless the vehicle is moved to the place where the mounting pallet is placed. In addition, it is difficult to cope with a circumstance where snow removal is necessary in various places. Further, it difficult to respond to individual users' requests for snow removal because additional work and space are necessary to place the mounting pallet on the ground surface on which the vehicle is going to be parked and to attach devices that vibrate and slant the mounting pallet.

JP-A No. H4-118339 discloses a technique adapted to heat an upper face of a bus roof to melt and slide the snow in contact with the bus roof. However, to achieve such an operation, it is necessary to add components such as a water pipes and a pump that are not provided to an ordinary bus. Further, water flowing on a ceiling portion of the bus can generate inconveniences such as a weight imbalance of the entire bus or water leakage. This can result in an increase in complexity of a bus ceiling structure and manufacturing operations.

It is desirable to provide a drive motor control system that makes it possible to induce specific movements of a vehicle including a drive motor that causes the vehicle to travel, and a snow removal system that makes it possible to remove the snow accumulated on the vehicle.

In the following, a drive motor control system and a snow removal system for a vehicle according to an example embodiment of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a drive motor control system 10 that executes control of a drive motor 16 of a vehicle according to an example embodiment of the disclosure. The drive motor control system 10 includes a control processor 12 that performs operational control in the control of the drive motor 16 of the vehicle according to the example embodiment of the disclosure. The vehicle may include an operational state detector 14 that detects various operational states of the vehicle and sends detection signals indicating the detected operational states to the control processor 12, the drive motor 16 for travel of the vehicle, and a battery 20 that supplies driving currents to the drive motor 16 via an inverter 18. Torque of the drive motor 16 may be supplied to a vehicle shaft of the vehicle via a transmission 22. A remote key 11 may be used to transmit an instruction to start the control. The remote key 11 may be an ordinary key provided with a control start switch.

The operational state detector 14 that detects various operational states of the vehicle may be coupled to the control processor 12. Based on signals received from the operational state detector 14, the control processor 12 determines whether a parking range is being selected, whether the vehicle is being stopped, and whether a parking brake is being released. Note that an illustration of an operational state determiner in the control processor 12 is omitted in FIG. 1.

Whether the parking range is being selected or whether the parking brake is being released may be determined by determining whether an operation on the shift lever or the key has been performed by a user. Whether the vehicle is being stopped may be determined by detecting rotational states of the wheels, for example.

The drive motor control system 10 having the configuration described above may cause the drive motor 16 to be described later to perform an operation to remove a snow accumulated on the vehicle. In that case, the drive motor control system 10 may serve as a snow removal system according to the example embodiment.

Figure 2:
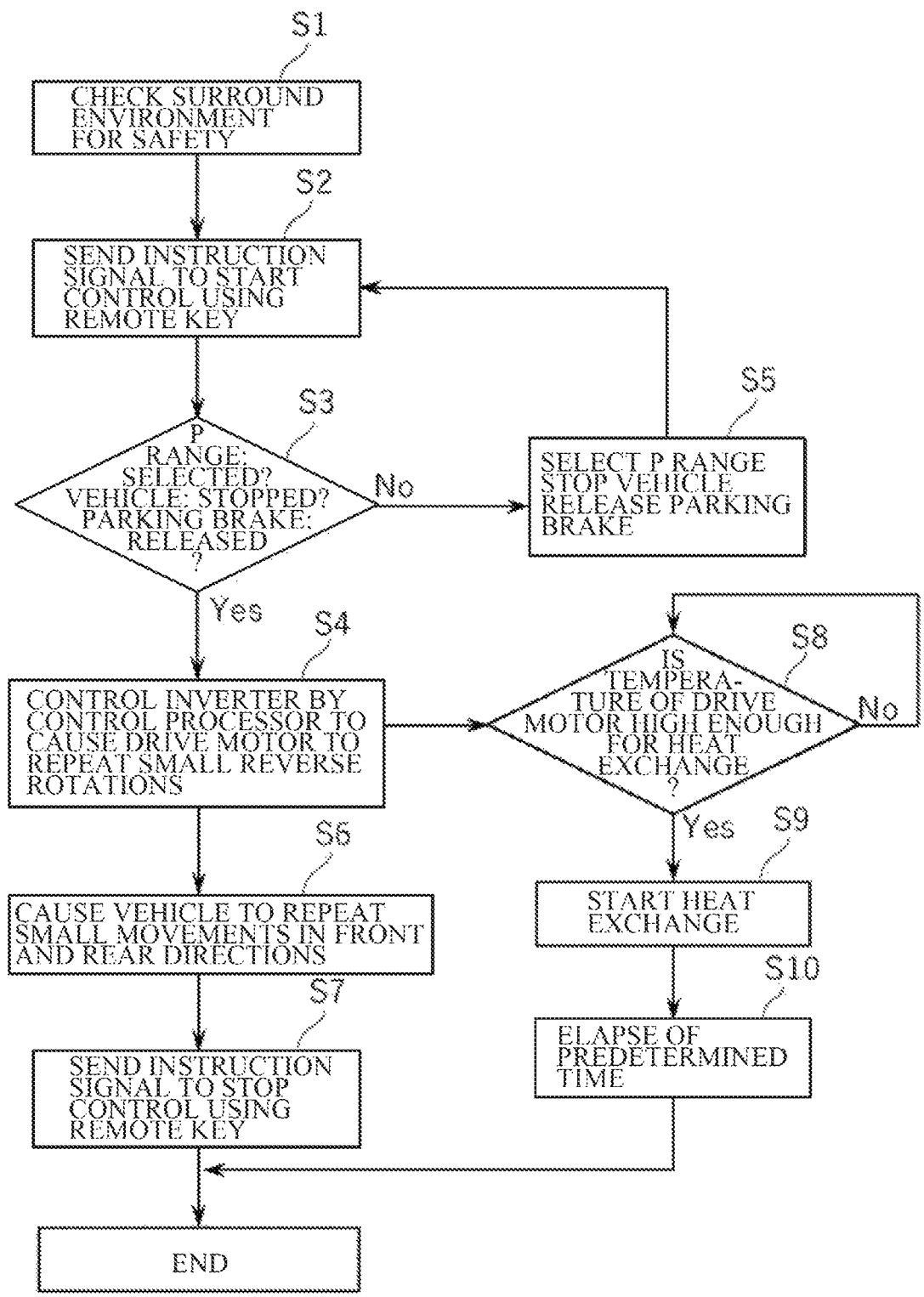
FIG. 2 is a flowchart of an exemplary procedure for drive motor control according to one example embodiment of the disclosure.

FIG. 2 is a flowchart of an exemplary procedure for drive motor control with the drive motor control system 10 according to the example embodiment. In accordance with the procedure for the drive motor control illustrated in FIG. 2, predetermined movements of the vehicle are induced to remove the snow accumulated on the vehicle.

As illustrated in FIG. 2, the user may check a surrounding environment of the vehicle for the safety in a snow removal operation, for example (Step S1). The user may remove an obstacle, if any, and thereafter operate the remote key 11 to send an instruction signal to start the drive motor control according to the example embodiment to remove the snow (Step S2). The instruction signal which triggers the control is not limited to the signal generated by operating the remote key 11, and may be a signal generated by operating another switch provided on an operation panel of the vehicle.

The control processor 12 may receive the instruction signal from the remote key 11, and may receive signals for the determination as to whether a condition that the parking range is being selected, a condition that the vehicle is being stopped, and a condition that the parking brake is being released are satisfied, from the operational state detector 14. The control processor 12 may determine whether all these three conditions are satisfied (Step S3). When all the conditions are satisfied, that is, when a result of the AND condition determination is "Yes" (Step S3: Yes), the control processor 12 may start operational control of the drive motor 16 to cause the drive motor 16 to perform an operation to remove the snow accumulated on the vehicle. For example, the control processor 12 may control the inverter 18 that converts a direct current received from the battery 20 into a three-phase alternating current to cause the drive motor 16 to repeat small reverse rotations (Step S4).

When any of the conditions is not satisfied (Step S3: No), the user may perform an operation to select the parking range, an operation to stop the vehicle, and an operation to release the parking brake so that all of the conditions are satisfied (Step S5). This allows the control processor 12 to perform the control described above.

Next, control in Step S4 is described in detail. First, when the result of the determination at Step S3 is "Yes", that is, in a case where the parking range is being selected, where the vehicle is being stopped, and where the parking brake is being released, the vehicle is not driven to actively move but is movable using some kinds of driving power within a small range. For example, even while the parking range is being selected, the vehicle body is slightly movable in front and rear directions if the parking brake is being released.

The example embodiment of the disclosure focuses on the movable range of the vehicle, which includes the drive motor for travel, obtained when the parking range is selected by the user of the vehicle. According to the example embodiment, it is possible to safely achieve a desired operation while the parking range is being selected. The movable range of the vehicle obtained while the parking range is being selected is described below.

Figure 3:
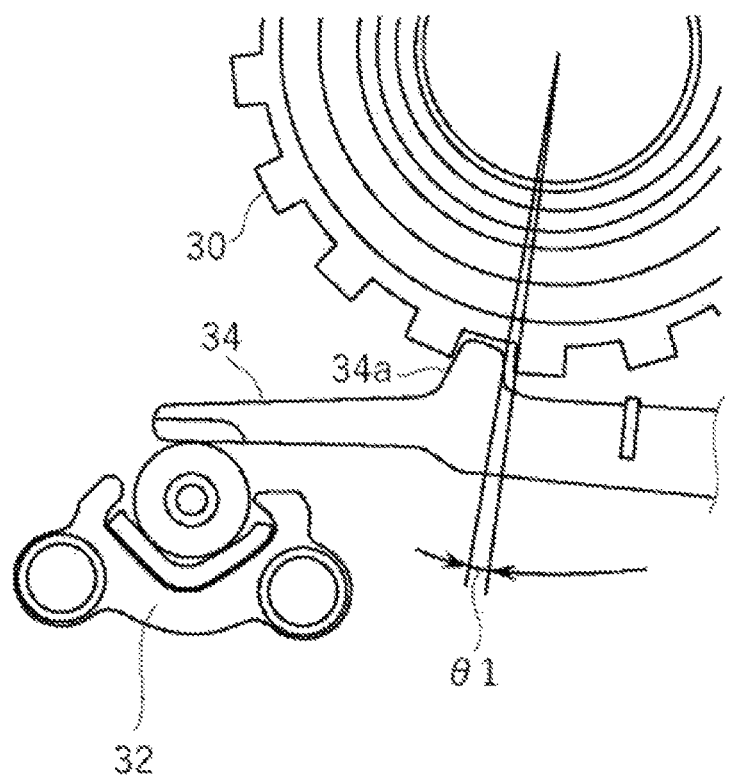
FIG. 3 is an explanatory diagram illustrating an angle of a clearance of a parking lock gear defined when a parking range is selected.

FIG. 3 illustrates an exemplary operation of a parking mechanism performed while the parking range is being selected. As illustrated in FIG. 3, a parked state may be secured by the engagement between a parking gear 30 provided on a transmission side and a protrusion 34a of a parking lock pole 34 which is rotationally moved by a parking rod 32. That is, a rotational movement on the transmission side may be regulated by regulating a rotation of the parking gear 30. In such a state where the protrusion 34a of the parking lock pole 34 engages with the parking gear 30, a slight clearance may be defined between the protrusion 34a and a side face of a teeth of the parking gear 30.

The clearance illustrated in FIG. 3 may have an angle θ1 which is about three degrees, for example. The parking gear 30 may be rotatable within the range of clearance. That is, the vehicle may be movable in the front and rear directions within a movable range corresponding to the range of clearance which is three degrees. In this case, the vehicle may be movable within a range from 1 mm to 3 mm both inclusive, for example.

When the control processor 12 controls the inverter 18 to cause the drive motor 16 to repeat the small reverse rotations in Step S4 as described above, the vehicle may repeat small movements in the front and rear directions (Step S6).

Figure 5A:
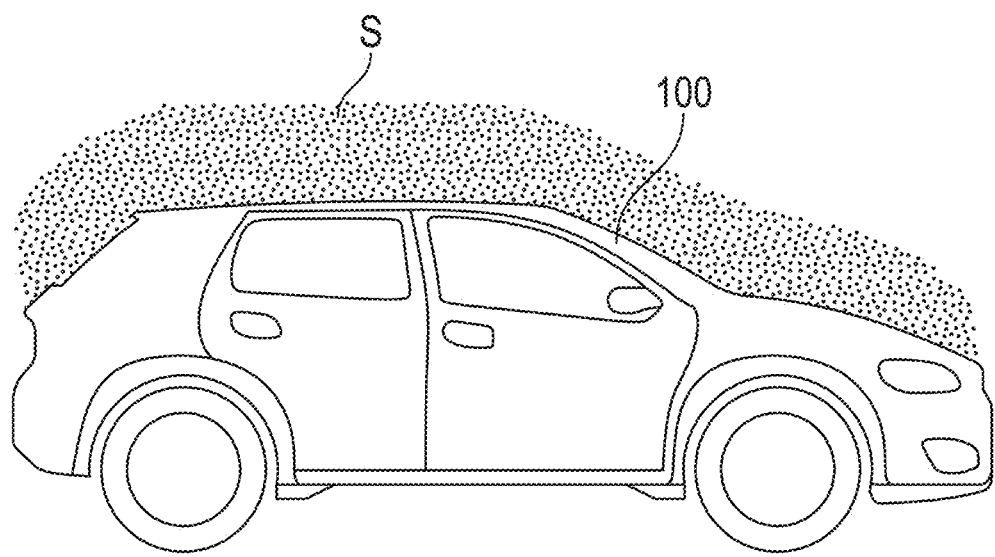
FIG. 5A is an explanatory diagram illustrating an operation of the drive motor control system according to the example embodiment illustrated in FIG. 1 which is used as a snow removal system.
Figure 5B:
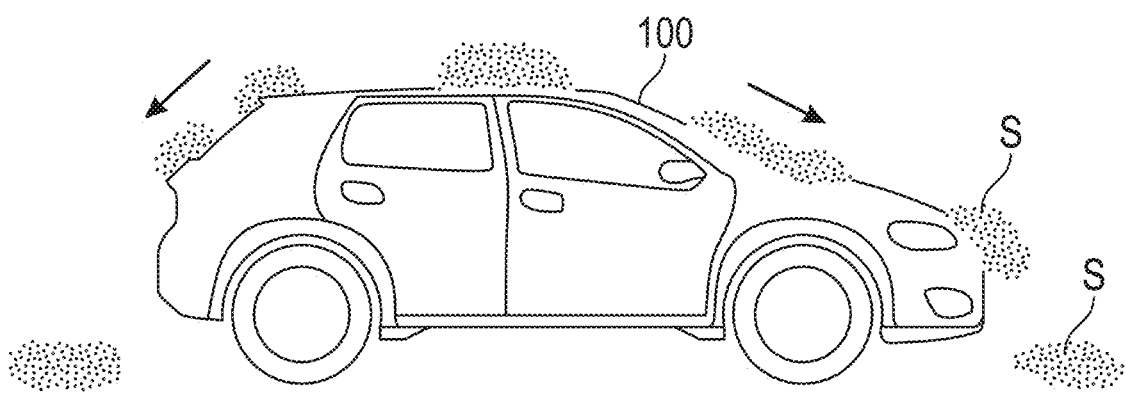
FIG. 5B is an explanatory diagram illustrating an operation of the drive motor control system according to the example embodiment illustrated in FIG. 1 which is used as the snow removal system.

FIGS. 5A and 5B illustrate the removal of snow S accumulated on a vehicle 100 including the drive motor control system 10 utilizing the small movements such as vibrations of the vehicle 100 in the front and rear directions. The vehicle 100 may have slopes on substantially the entire outer surface including a ceiling, a windshield, a rear window, and the like. Thus, when the vehicle 100 repeats the small vibrations in the front and rear directions, the snow S accumulated on the vehicle 100 may be separated from the outer surface of the vehicle 100. When the vehicle 100 further exhibits the small vibrations, the snow S may be moved and fall from the vehicle 100 along the slops on the outer surface of the vehicle 100.

Even if the snow S is not completely removed from the vehicle 100, the configuration described above makes it possible to reduce final snow removal work to be manually performed by the user of the vehicle 100. The vehicle 100 may be controlled to exhibit the small movements in the front and rear directions at a vibration frequency of 5 to 100 Hz.

Additional control may be performed in the example embodiment as follows. When the vehicle 100 exhibits the small vibrations in the front and rear direction in Step S4, the drive motor 16 may generate heat. In the additional control, the heat of the drive motor 16 may be used to heat the battery 20. For example, in Step S8, it may be determined whether the drive motor 16 has reached a temperature high enough for heat exchange. For instance, it may be determined whether an oil temperature of the transmission 22 has reached a predetermined temperature or higher. When it is determined that the oil temperature of the transmission 22 has reached the predetermined temperature or higher, it may be determined that the heat exchange is available. When it is determined that the drive motor 16 is in the state where the heat exchange is available (Step S8: Yes), the heat exchange may be started (Step S9). After an elapse of a predetermined time (Step S10), the control of the drive motor 16 may end.

Figure 4:
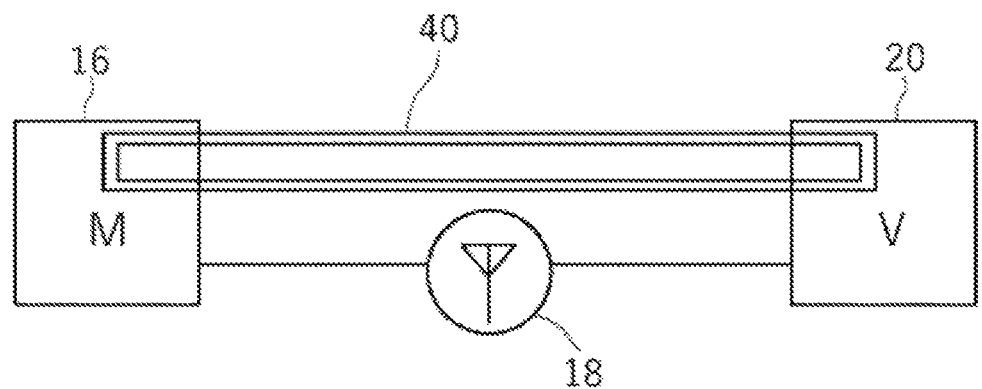
FIG. 4 is an explanatory diagram illustrating a method of increasing a battery temperature utilizing the heat of the drive motor of the vehicle generated upon small movements of the vehicle, according to one example embodiment of the disclosure.

FIG. 4 illustrates a schematic configuration for the control of the heat exchange. The configuration may include a passage 40 to circulate a fluid between the drive motor 16 and the battery 20. With the configuration, the heat of the drive motor 16 generated upon the snow removal operation may be utilized to heat the battery 20. This makes it possible to reduce time to heat the battery 20 in a cold state to a temperature at which the performance of the battery 20 is properly secured. According to the example embodiment, it is assumed that the temperature of the drive motor 16 is easy to be elevated when the small movements of the vehicle 100 in the front and rear directions is inducted by controlling the drive motor 16, and the elevated temperature may be utilized to heat the battery 20.

The disclosure is not limited to the example embodiments described above, and various modifications may be made without departing the gist of the disclosure. For example, the vehicle 100 may be a hybrid vehicle or an electric vehicle as long as the vehicle includes the drive motor for travel according to the example embodiment of the disclosure. Further, a travel distance of the vehicle 100 during a braking operation or the cycle of the movement in the front and rear directions may be modified in various ways within the movable range of the vehicle 100 depending on the type of the vehicle 100 or the condition of accumulated snow.

According to the drive motor control system for a vehicle according to the example embodiment of the disclosure, the small movements of the vehicle, which includes the drive motor for travel, in the front and rear directions are induced by the components of the vehicle while the parking range is being selected. Accordingly, it is possible to cope with various concerns by vibrating the vehicle.

Further, when the drive motor control system is used as the snow removal system, the small vibrations of the vehicle in the front and rear directions are induced while the parking range is being selected. The movements make it possible to move the snow accumulated on the vehicle and cause the snow to fall along the slope of the vehicle. This facilitates the removal of the snow.

The invention claimed is:

1. A snow removal system for a vehicle, the vehicle comprising a drive motor for travel of the vehicle and a battery coupled to the drive motor via an inverter and serving as a driving current supply source, the snow removal system being configured to perform control of the drive motor of the vehicle and comprising a control processor configured to control an electric current supply from the battery to the drive motor, the control processor comprising an operational state determiner configured to determine whether a condition that the vehicle is being stopped, a condition that a parking brake is being released, and a condition that a parking range is being selected are satisfied, wherein the control processor is configured to, when the operational state determiner determines that all of the condition that the vehicle is being stopped, the condition that the parking brake is being released, and the condition that the parking range is being selected are satisfied upon a reception of a trigger signal instructing a start of the control of the drive motor, perform control of the inverter such that the electric current supply from the battery to the drive motor is performed to cause the drive motor to repeat small reverse rotations and thereby induce small movements of the vehicle in a front direction and a rear direction.

2. A drive motor control system for a vehicle, the vehicle comprising a drive motor for travel of the vehicle and a battery coupled to the drive motor via an inverter and serving as a driving current supply source, the drive motor control system being configured to perform control of the drive motor of the vehicle and comprising a control processor configured to control an electric current supply from the battery to the drive motor, the control processor comprising an operational state determiner configured to determine whether a condition that the vehicle is being stopped, a condition that a parking brake is being released, and a condition that a parking range is being selected are satisfied, wherein the control processor is configured to, when the operational state determiner determines that all of the condition that the vehicle is being stopped, the condition that the parking brake is being released, and the condition that the parking range is being selected are satisfied upon a reception of a trigger signal instructing a start of the control of the drive motor, perform control of the inverter such that the electric current supply from the battery to the drive motor is performed to cause the drive motor to repeat small reverse rotations and thereby induce small movements of the vehicle in a front direction and a rear direction.

3. The drive motor control system according to claim 2, wherein the small movements of the vehicle in the front direction and the rear direction are induced by the control of the inverter by the control processor within a movement distance range from 1 to 3 millimeters both inclusive in each of the front direction and the rear direction and at a vibration frequency of 5 to 100 hertz both inclusive.

4. The drive motor control system according to claim 2, wherein a fluid is to be circulated between the drive motor and the battery to absorb heat generated at the drive motor upon an occurrence of the small movements of the vehicle in the front direction and the rear direction induced by the control of the inverter by the control processor, and the heat generated at the drive motor is transferred to the battery via the fluid.

5. The drive motor control system according to claim 2, wherein the vehicle further comprises a parking mechanism comprising a parking gear and a parking lock pole, the parking lock pole being configured to engage with the parking gear to regulate a rotation of the parking gear, and the small movements of the vehicle in the front direction and the rear direction are induced by the control of the inverter by the control processor within a movable range of the parking gear in a rotational direction, the movable range comprising a range of a clearance defined between the parking lock pole and the parking gear in a state where the parking lock pole engages with the parking gear.

6. The drive motor control system according to claim 5, wherein the small movements of the vehicle in the front direction and the rear direction are induced by the control of the inverter by the control processor within a movement distance range from 1 to 3 millimeters both inclusive in each of the front direction and the rear direction and at a vibration frequency of 5 to 100 hertz both inclusive.

7. The drive motor control system according to claim 5, wherein a fluid is to be circulated between the drive motor and the battery to absorb heat generated at the drive motor upon an occurrence of the small movements of the vehicle in the front direction and the rear direction induced by the control of the inverter by the control processor, and the heat generated at the drive motor is transferred to the battery via the fluid.

\* \* \* \* \*